Patented Oct. 8, 1929

1,730,702

UNITED STATES PATENT OFFICE

JOHN C. WICHMANN, OF LOS ANGELES, CALIFORNIA, ASSIGNOR TO CACTUS RUBBER COMPANY OF AMERICA, A CORPORATION

PROCESS OF MAKING RUBBERLIKE MATERIALS

No Drawing.  Application filed September 20, 1927. Serial No. 220,842.

My invention relates to a process of making a rubber-like material and the resulting product.

It is an object of this invention to treat certain plants in a manner to form a product which is very similar to the Pará rubber of commerce.

In my United States Patent, No. 1,379,149, granted May 24, 1921, for a process of making rubber-like material and resulting product, and in my United States Patent No. 1,435,360, granted November 14, 1922, for a process of making rubber-like material, I have described a process of treating members of the cactus family, in which among other ingredients asphaltum was added.

I have discovered in the course of my experiments that the processes in the patents mentioned may be simplified and that the addition of asphaltum may be dispensed with without in any manner detracting from the qualities of a finer product.

My invention consists in the steps of the process hereinafter described and claimed:

I take members of the cactus family, (Cactaceæ), the Burbank spineless cactus (prickly pear) and ocotillo. I may use them either singly or collectively in my process.

The plant is first macerated and placed in a steam jacketed boiler and cooked for about one half hour at ten pounds pressure or 240° F. This temperature will release all the gummy and mucilaginous substances next to the skin of the plant where they are found in greatest abundance. The cooked pulp is now placed in a steam jacketed press and the juice extracted therefrom. I now add 1 or 2 ounces of sodium tungstate or sodium molybdate, or a mixture of the two and concentrate the juice until it has the consistency of thick molasses. The sodium tungstate or sodium molybdate is calculated on 100 pounds of concentrated juice. Now I add 10 to 15 pounds of Pará rubber or reclaimed rubber, the latter being preferred because of its lower cost, dissolved in turpentine, and add the same to the mixture together with 1½ to 2 pounds of powdered sulphur and ½ pound of an accelerator such as is well known in the art of processing rubber. However, I prefer to use a hexamethylene tetramine as an accelerator, which I prefer to mix with 3½ pounds of zinc oxide. The accelerator thus prepared acts as a catalyst and gives tensile strength and imparts high resilience to the finished cactus rubber compound. The mixture is thoroughly stirred and heated in a closed vessel, preferably steam jacketed under a pressure of 5 pounds for approximately one and one half hours. The vessel is preferably provided with a stirring mechanism to keep the mixture agitated.

The mixture is then run into flat cooling vats and air, preferably heated, is injected into the mass, preferably divided into minute bubbles to oxidize the same. This oxidizing treatment requires from 3 to 5 days and the mixture which at the beginning of the oxidizing treatment had the appearance and color of heavy molasses is slowly oxidized and solidified to a rubber-like material resembling crude Pará rubber and may be used as such in the manufacture of rubber articles for all purposes for which Pará rubber is used.

The term rubber in the claims is intended to cover both pure Pará rubber as well as the reclaimed rubber.

Various changes may be made in the steps of the process by those skilled in the art without departing from the spirit of my invention as claimed.

I claim:

1. A process of making a rubber-like material comprising heating the fleshy parts of members of the cactus family above the boiling point of water, extracting the juice therefrom, adding approximately two ounces of sodium tungstate, concentrating the juice, the sodium tungstate being calculated on 100 pounds of concentrated juice, adding approximately 15 pounds rubber dissolved in turpentine, 2 pounds of powdered sulphur and one half pound of boiled linseed oil to the mixture, heating the mass in a closed vessel under agitation under a pressure of 5 pounds for one and one half hours and drying and oxidizing the resulting mass.

2. A rubber-like material resulting from the boiling of the concentrated juice of the fleshy parts of the cactus family in association with sodium tungstate, sodium molybdate, boiled linseed oil and rubber dissolved in turpentine, and the drying and oxidizing of the resulting mass.

3. A rubber-like material resulting from boiling 100 pounds of concentrated juice of the fleshy parts of members of the cactus family together with 2 ounces of sodium tungstate, 15 pounds of rubber dissolved in turpentine, ½ pound boiled linseed oil, and the drying and oxidizing of the resulting mass.

In testimony whereof I have signed my name to this specification.

JOHN C. WICHMANN.